(12) United States Patent
Palmer

(10) Patent No.: US 9,820,493 B1
(45) Date of Patent: Nov. 21, 2017

(54) FIELD DRESSING APPARATUS

(71) Applicant: John Patrick Palmer, Durango, CO (US)

(72) Inventor: John Patrick Palmer, Durango, CO (US)

(*) Notice: Subject to any disclaimer, the term of this patent is extended or adjusted under 35 U.S.C. 154(b) by 0 days.

(21) Appl. No.: 15/499,496

(22) Filed: Apr. 27, 2017

(51) Int. Cl.
*A22B 5/06* (2006.01)
*A01M 31/00* (2006.01)

(52) U.S. Cl.
CPC ............ *A22B 5/06* (2013.01); *A01M 31/00* (2013.01)

(58) Field of Classification Search
CPC ....... A22B 5/06; A22B 5/0005; A22B 5/0017; A22B 5/0047; A22B 5/16; A22B 5/161
USPC ............... 452/185, 187–192, 194–196, 197
See application file for complete search history.

(56) References Cited

U.S. PATENT DOCUMENTS

| | | | | |
|---|---|---|---|---|
| 4,763,942 A * | 8/1988 | Lyon | .................. | A22B 5/06 294/81.5 |
| 4,977,644 A * | 12/1990 | Evans | .................. | A22C 25/06 269/258 |
| 6,994,618 B1 * | 2/2006 | Syers | .................. | A22B 5/06 452/187 |
| 7,374,388 B2 * | 5/2008 | Holt | .................. | B60P 1/5471 212/180 |
| 8,870,637 B1 * | 10/2014 | Leuallen | .................. | A22C 25/06 452/195 |
| 2006/0046631 A1 * | 3/2006 | Howard | .................. | A22C 25/06 452/195 |
| 2006/0252359 A1 * | 11/2006 | Helbing | .................. | A22B 5/06 452/194 |
| 2007/0254581 A1 * | 11/2007 | Hoffmann | .................. | A22B 5/06 452/187 |
| 2014/0199927 A1 * | 7/2014 | Frederick | .................. | A22B 5/06 452/194 |

* cited by examiner

Primary Examiner — Richard Price, Jr.
(74) Attorney, Agent, or Firm — Bradley Fox

(57) ABSTRACT

A portable apparatus for securing an animal for field dressing comprising a base configured to be supported on a flat surface, a first upright member, a second upright member, and a horizontal member extending from the base for support. The base supports the upright members spaced apart in a manner that supports the head of an animal. The upright members include a way for fastening the legs of the animal to the upright posts to spread the animal to permit the animal to be field dressed.

6 Claims, 5 Drawing Sheets

FIELD DRESSING APPARATUS

FIELD OF THE INVENTION

The present invention relates to devices and processes for field dressing deer and related animals.

BACKGROUND ART

When hunting deer or other big game, it is advantageous to dress the animal before you leave the woods or hunting area and also to dress the animal rather quickly after killing it. Field dressing an animal is often a difficult process when the hunter is alone.

Generally, there are two basic ways to position the animal when dressing the animal: hoist the animal from a tree or other upright structure, or lay the animal on its back. Hoisting a deer may be a cumbersome undertaking, especially if the deer is of substantial size and the apparatus needed to hoist an animal is typical cumbersome and not practical for a solo hunter to take into the field. Furthermore, you may be in an open field or other area where there are no trees around.

The other option is to lay the animal on its back. However, to properly field dress or eviscerate an animal, the animal needs to be stationary, which normally requires either propping the animal up against a tree or other structure, or to have a second person hold the animal stationary. As previously stated, there may be no trees in the area where you are dressing the animal and simply propping the animal against a tree does not create a position optimal for field dressing. Also, if the hunter is solo there may be no one close around to hold the deer while you are dressing the deer.

What is needed is a portable device that holds the animal in a position that permits proper field dressing of the animal.

SUMMARY OF THE INVENTION

The present invention is a portable apparatus for field dressing an animal by hunters in the field and particularly a solo hunter in the field. The apparatus comprises a base that can be placed on the ground or other relatively flat surface. The base supports two upright members spaced apart to permit an animal to be placed between the upright members. A third member extends substantial horizontally from the base to further support the base from tipping over while holding the animal. The upright members each include a fastening component to hold the legs of the animal to the upright members. When in use, the animal is placed between the upright members with the legs attached to each respective leg fastener such that the animal is positioned for proper field dressing.

Generally, a solo hunter uses the apparatus of the current invention in the field. As such, the apparatus is intended to be portable and may be transported and assembled in the field. The base in one embodiment is designed as a carrying case configured to store the individual components of the present invention when not in use or for transport. The base is designed as a clamshell case. The carrying case has openings molded into the case to accept various elements of the present invention. When in use, the two upright members and the horizontal member may be removed from storage in the base and inserted into the respective positions in the molded openings. The animal may now be positioned for field dressing. The base may also have the capacity to hold other associated devices for hunting such as a knife. When animal processing is complete, the upright members and horizontal members can be removed and placed back in the carrying case, then the apparatus can be packed to take home from the field.

This invention will become more fully understood from the following detailed description, taken in conjunction with the accompanying drawings described herein below, and wherein like reference numerals refer to like parts.

DETAILED DESCRIPTION OF INVENTION

The following detailed description is of exemplary embodiments of the invention. The description is not to be taken in a limiting sense but is made merely for the purpose of illustrating the general principles of the invention, since the scope of the invention is defined by the claims. Various inventive features are described below that can be used independently of one another or in combination with other features.

Figure 1:
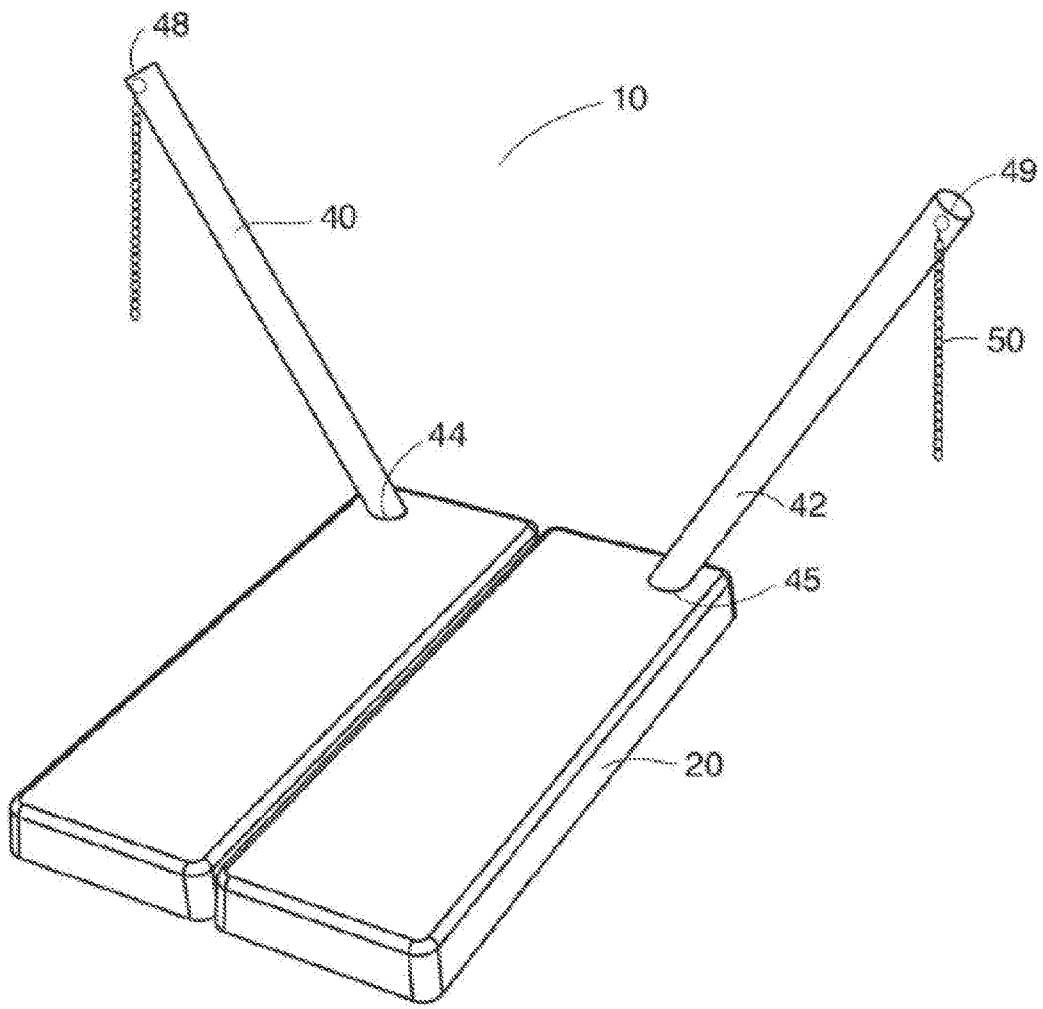
FIG. 1 is a perspective view of the field dressing apparatus of the present invention.
Figure 2:
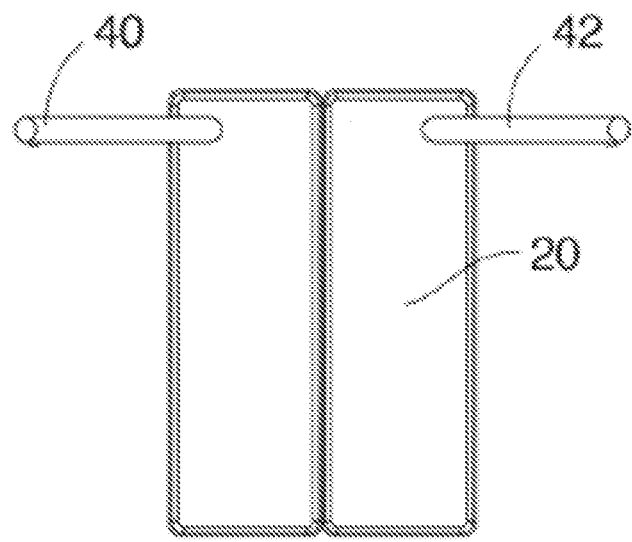
FIG. 2 is a top view of an embodiment the invention.
Figure 3:
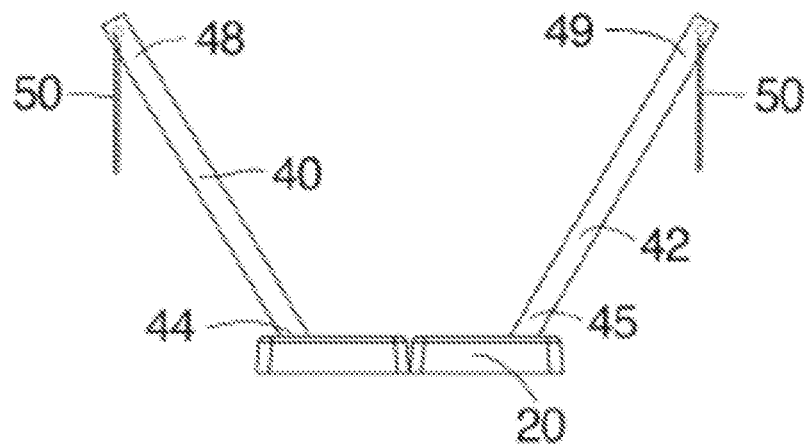
FIG. 3 is a front view of an embodiment the invention.
Figure 4:
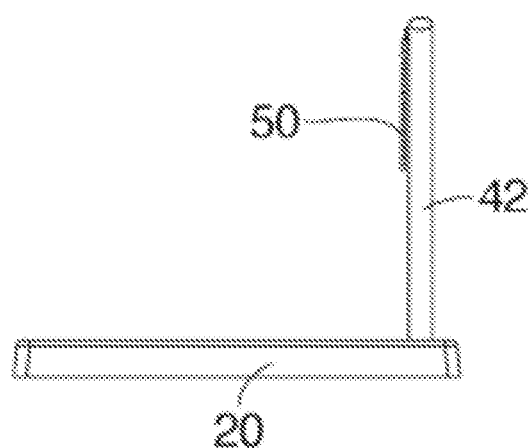
FIG. 4 is a side view of an embodiment the invention.

Broadly, with reference to FIG. 1, embodiments of the present invention generally provide an apparatus 10 for positioning an animal for field dressing. The field dressing apparatus 10 may be used by a solo hunter or to assist a group of hunters. Further, the field dressing apparatus 10 is intended to be transportable into the field where animals are hunted, but the present invention may be use to field dress an animal in any location.

With reference to FIGS. 1-4, one embodiment of the present invention includes a base 20, a first upright post 40 and a second upright post 42 spaced apart from the first upright post. The upright posts 40, 42 extend from the base in a plane generally perpendicular to the base 20. The upright posts 40, 42 have first ends 44, 45 and second ends 48, 49. The first ends 44, 45 are configured to attached to the base 20. The second ends 48, 49 typically include a leg fastener 50 that is configured to secure the leg of an animal when the animal is placed in the apparatus 10. Thus, when in use the animal is placed between the upright posts 40, 42 the legs are secured to each post via the leg fasteners 50 to position the animal optimally for field dressing.

FIGS. 1-4 show one embodiment of the base 20. The base 20 may be configured in any manner that supports the upright posts 40, 42. The base 20 may be made from any material sufficient to withstand the forces placed upon it when an animal is placed within the upright posts 40, 42 and secured in place. The base 20 maybe a single member or formed from multiple members. The base 20 may include a hinge or other similar feature that permits the base to extend and provide support while maintaining transportability. The base 20 may include fixed or adjustable feet to stabilize or level the base.

Figure 5:
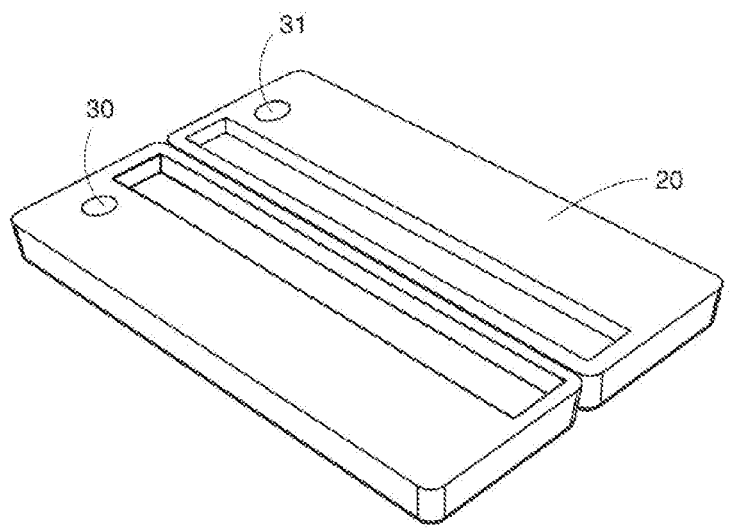
FIG. 5 is a perspective view of an embodiment of the base of the invention.
Figure 6:
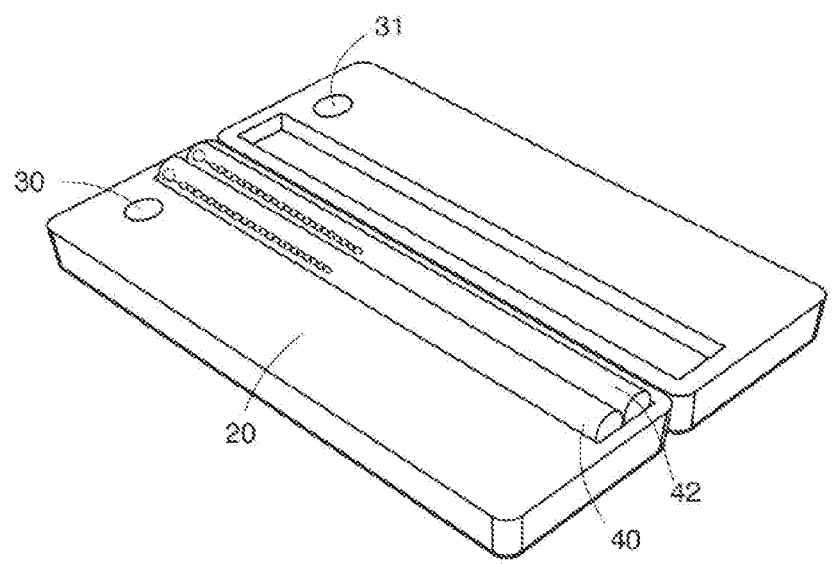
FIG. 6 is a perspective view of an embodiment of the base of the invention with upright posts placed for storage.
Figure 7:
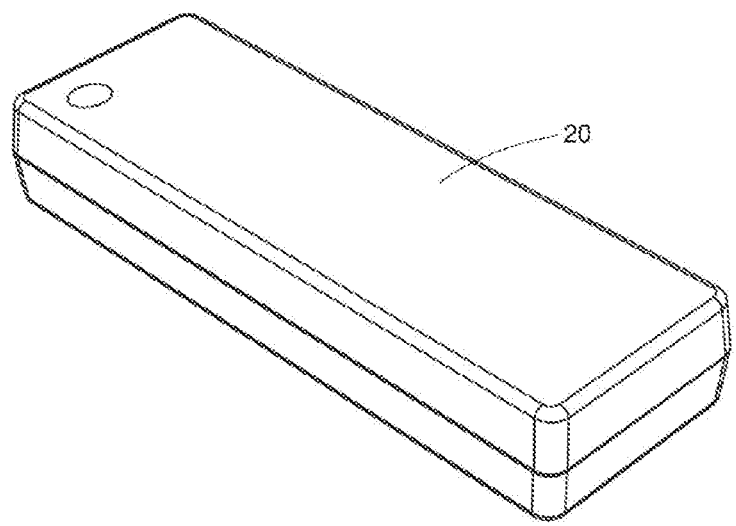
FIG. 7 is a perspective view of an embodiment of the base of the invention in the closed position for transport or storage.

With reference to FIG. 5-7, in an embodiment of the invention, the base 20 is configured to act as a carrying case for the field dressing apparatus 10. The base 20 is configured in the shape of a clamshell container or case that opens to lie flat on the ground. A clamshell container is a one-piece container consisting of two halves joined by a hinge area that allows the structure to come together to close and open and lie flat. The base 20 is made from blow molded plastic, but other materials and processing methods may be used to construct the base 20. In an embodiment the base 20 has molded receptacles to contain other components of the present invention. FIG. 5 shows the base 20 with receptacles to store the upright posts 40, 42. FIG. 6 shows an embodiment of the base with the upright posts 40, 42 stored in place. FIG. 7 shows the base 20 in the closed position for storage or transport. The base 20 may also contain receptacles to store other devices to assist a hunter such as a knife. When in the closed position the base 20 acts as a carrying case to transport the present invention. The clamshell case is constructed to contain the components of the invention to transport and store the invention. When in use, the clamshell is extended open and each of the other components of the invention can be assembled. In one embodiment, a portion the base 20 has a molded recess to support the animal. The recess may support the head or hind of the animal.

The base 20 has a number of openings 30, 31 to accept the upright posts 40, 42 and secured them in their assembled position. In one embodiment, openings 30, 31 are placed at angles to the base 20 such that when the upright posts are in place they create a spaced apart relationship between the upright posts to accommodate the animal. In yet another embodiment, the openings 30, 31 are spaced apart perpendicular to the base. The openings 30, 31 are placed in a substantially perpendicular plane to the base, but may be placed in any configuration that create a spaced apart relationship between the upright posts. In still another embodiment, the base 20 further includes a support opening to receive a support member. The support opening is generally in a plane horizontal to the base 20.

In another embodiment of the base 20, the base is made of plastic and the openings 30, 31 are molded into the plastic during the manufacture of the base 20. The molded openings are of a size and shape to match the size and shape of the upright posts 40, 42. The openings 30, 31 receive the first ends of the upright posts 44, 45 when the apparatus is assembled. The openings 30, 31 may also include reinforcing inserts made from a metallic material or other reinforcing material. The reinforcing inserts may be threaded or smoothed to accept the first ends of the upright posts 44, 45. The reinforcing insert may be of another shape that reinforces the connection between the upright post 40 and the base 20.

In one embodiment, the first ends of the upright posts 44, 45 having a metal plate that inserts into a matching opening in the base 20 to secure the upright posts to the base 20. In an alternative embodiment, the first end of the upright post 40 is hingedly attached to the base such that it translates and locks into place when in the apparatus is in use, and folds down into the base for storage and transport. In still another embodiment, the first ends of the upright posts 44, 45 are threaded into a corresponding threaded opening in the base 20. Each of these embodiments is illustrative and other methods of attaching the first ends of the upright posts 44, 45 to the base 20 such that the upright posts are in position to secure the legs of an animal are within the scope of this invention.

Figure 8:
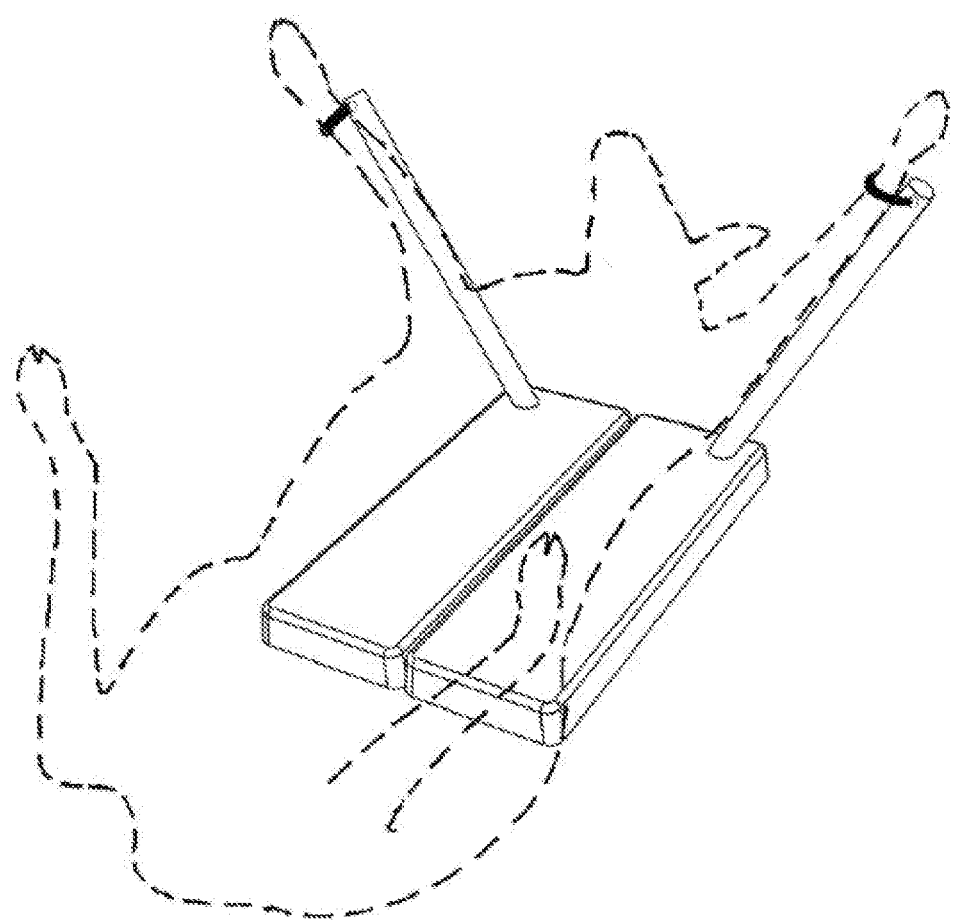
FIG. 8 is a top perspective view of an embodiment of the present invention.

FIG. 8 shows the apparatus assembled for use. When in use, the apparatus 10 is set up on a relatively flat surface. The base 20 is placed on the ground. The upright posts 40, 42 are inserted into the upright openings 30, 31. The upright posts 40, 42 are then configured to accommodate an animal during use. The animals legs are secured to the leg fasteners The upright posts 40, 42 are typically made from a metallic material, but may be formed from any material sufficiently strong to secure the legs of an animal. The upright posts 40, 42 may be made from one or more segments. In an alternative embodiment, the upright posts 40, 42 are telescopic and may be extended to contracted to a desired length.

In an alternative embodiment, upright posts 40, 42 may be formed from a single Y-shaped piece or U-shaped piece. The upright posts 40, 42 may be straight or curved. In such an embodiment, removal of the first upright post would result in removal of both posts at one time. In such an embodiment, the animal is positioned in the V-shaped or U-shaped area and secured as described above.

The leg fasteners 50 may be configured as chains as shown in FIGS. 1-4. In another embodiment the leg fastener may be a cleat and cordage. Each upright post may have more than one leg fastener or only one post may have a leg fastener. The cleat may take any configuration that permits the cordage to secure the leg of an animal. The cordage may be made of a rope, a chain, a wire, etc. In an alternative embodiment a skewer replaces the cleat and cordage that secures the leg. In still another embodiment, the cleat and cordage are replaced by a hook and loop strap. Any means of securing the leg of an animal to the upright post 40 or 42 is within the scope of this invention.

In one embodiment, the support member 80 extends in a plane substantially horizontal to the base 20. The support member 80 provides support to the base 20 to keep the base 20 from tipping when an animal is placed in the apparatus 10. In one embodiment, the support member 80 is a column that fits in the support opening 32 in the base. The support member column may take any shape. The support member may be made of any material. In an alternative embodiment, the support member 80 is integral with the base 20. The support member may be molded into the base 20 or fixed to the base 20 in a manner that maintains the base from tipping when an animal is placed in the apparatus 10.

Often, the head of an animal is placed between the upright posts 40, 42, and the front legs of the animal are secured to the upright posts 40, 42 using the leg fasteners 50. In an alternative embodiment, the hind portion of the animal is placed between the upright posts 40, 42 and the hind legs are secured to the upright posts 40, 42 using the leg fasteners 50.

It will be understood that the foregoing relates to exemplary embodiments of the invention and that modifications may be made without departing from the spirit and scope of the invention as set forth in the following claims.

What is claimed is:

1. A portable field dressing apparatus comprising:
   a clamshell container base configured to rest on the ground when open and provide storage when closed;
   the clamshell container base having a first opening and a second opening;
   a first upright post having a first leg fastener attached to the first opening of the clamshell container base;
   a second upright post having a second leg fastener attached to the second opening of the clamshell container base;
   wherein a portion of the first upright post and a portion the second upright post are spaced apart along the clamshell container base sufficient to receive an animal between the posts and to permit one leg of the animal to be secured to the first leg fastener and to permit a second leg of the animal to be secured to the second leg fastener.

2. The field dressing apparatus of claim 1, wherein the first leg fastener is a chain.

3. The field dressing apparatus of claim 1, wherein the first upright post and the second upright post are configured as a single member.

4. A portable field dressing apparatus comprising:
- a clamshell container base configured to rest on the ground having a first opening and a second opening;
- a first upright post removeably attached to the first opening having a first leg fastener;
- a second upright post removeably attached to the second opening having a second leg fastener and being spaced apart from the first upright post;
- wherein the clamshell container base is configured to contain the first upright post and the second upright post within the clamshell container base when the apparatus is disassembled.

5. The field dressing apparatus of claim 4, wherein the leg fastener is an adjustable chain.

6. The field dressing apparatus of claim 4, wherein the first opening extends entirely through the clamshell container.

\* \* \* \* \*